United States Patent
Bucknor et al.

(10) Patent No.: US 7,796,715 B2
(45) Date of Patent: Sep. 14, 2010

(54) METHOD AND APPARATUS FOR REDUCING INTRA-DEVICE INTERFERENCE

(75) Inventors: Brian E. Bucknor, Miramar, FL (US); John Ballen, Parkland, FL (US); William J. Wingfield, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 774 days.

(21) Appl. No.: 11/617,476

(22) Filed: Dec. 28, 2006

(65) Prior Publication Data

US 2008/0159447 A1    Jul. 3, 2008

(51) Int. Cl.
*H03D 1/04* (2006.01)
*H04B 1/10* (2006.01)

(52) U.S. Cl. .................... 375/346; 455/317

(58) Field of Classification Search ............. 375/130, 375/346, 350; 455/296, 317
See application file for complete search history.

(56) References Cited

U.S. PATENT DOCUMENTS

| | | | | |
|---|---|---|---|---|
| 5,585,716 | A * | 12/1996 | Gervais et al. | 324/142 |
| 5,731,728 | A * | 3/1998 | Greiss | 327/299 |
| 6,658,043 | B2 * | 12/2003 | Hardin et al. | 375/130 |
| 6,737,904 | B1 * | 5/2004 | Butaud et al. | 327/298 |
| 6,968,171 | B2 | 11/2005 | Vanderhelm et al. | |
| 2006/0056562 | A1 * | 3/2006 | Chen et al. | 375/376 |

OTHER PUBLICATIONS

EMC Component Group, "Low EMI Spread Spectrum: EMC 530 Clock Oscillator", 2007, pp. 8-9.

* cited by examiner

*Primary Examiner*—Khanh C Tran
(74) *Attorney, Agent, or Firm*—Scott M. Garrett

(57) ABSTRACT

A device (100) includes an AM generating circuit (106) which couples interference (132) into another part of the device (124). A second AM signal (304) is generated, having inverse modulation relative to the first AM signal, and is coupled to the affected part of the device to counteract the interference by reducing the effective harmonic content of the first AM signal.

18 Claims, 3 Drawing Sheets

METHOD AND APPARATUS FOR REDUCING INTRA-DEVICE INTERFERENCE

FIELD OF THE INVENTION

The invention relates generally to electronic devices having radio frequency circuits, and more particularly to ways of suppressing or reducing EMI generated by circuitry in one part of the device that couples into the radio frequency circuitry.

BACKGROUND OF THE INVENTION

Modern wireless devices, such as mobile communication devices, combine digital, analog, and radio frequency circuits together in close proximity. Over time, these systems have become more integrated, and packaged into smaller volumes. They have also been designed to perform more functions, and are now approaching the processing power of so called "palm top" computing platforms. These devices are now typically used, for example, to browse content on the Internet, execute software applications, and communicate in a variety of modes.

As digital systems have become increasingly faster, requiring higher frequency clock sources, designers have had to deal with the harmonic content of these clocks since they can be radiated and conducted to other circuitry in the device, causing performance degradation, if not worse. A typical way to deal with the problem is to select clock frequencies such that their harmonics do not fall within bands used by the radio frequency circuits, and specifically the receive bands in which the device receives RF signals.

The problem is made much more difficult, however, when a high frequency clock signal is switched on and off, such as may be done to reduce power consumption. Switching the high frequency clock signal on and off periodically results in an amplitude modulated signal. The harmonic content of such a signal tends to be broadband, with spurs around the harmonics of the high frequency clock signal located plus and minus the switching frequency of the modulating signal. These spurs and their harmonics make it nearly impossible to remove the resulting noise from the receive band by conventional frequency planning. Therefore there is a need for a means by which such broadband harmonic content can be reduced at the radio frequency components of the device.

SUMMARY OF THE INVENTION

The present invention discloses in one embodiment a method of counteracting electromagnetic interference (EMI) in an electronic device, commenced upon generating a first modulated clock signal. The first modulated clock signal being the product of a high frequency clock signal and a low frequency clock signal, which has a certain duty cycle. The first modulated clock signal is radiated to at least one radio frequency component of the device. The invention further includes generating a second modulated clock signal, which is also the product of the high frequency clock signal and the low frequency clock signal, but the low frequency clock signal is applied with an inverted duty cycle. To counteract the EMI effect of the first modulated clock signal radiating into the RF component, the method further coupled the second modulated clock signal to the radio frequency component. Since the second modulated clock signal is the inverted version of the first modulated clock signal, the second modulated clock signal counteracts the harmonic content of the first modulated clock signal at the radio frequency component. In an embodiment of the invention, the first clock signal has a frequency greater than 1 megahertz. According to another embodiment of the invention, generating the first and second modulated clock signals comprises switching the high frequency clock signal with the low frequency clock signal. In another embodiment of the invention, coupling the second modulated clock signal comprises coupling the second modulated clock signal to a receiver amplifier of the electronic device. In a further embodiment of the invention, coupling the second modulated clock signal to the receiver amplifier comprises coupling the second modulated clock signal into an input of the receiver amplifier through an impedance. The invention may further include setting a value of the impedance so that the magnitude of the second modulated clock signal at the receiver amplifier is substantially equal to the magnitude of the first modulated clock signal at the receiver amplifier.

In another embodiment, the invention provides an electronic device including a high frequency clock source generating a high frequency clock signal and a low frequency clock source generating a low frequency clock signal. The device also includes a first switch means coupled to the high frequency clock source and the low frequency clock source for switching the high frequency clock signal with the low frequency clock signal to generate a first modulated clock signal at an output of the first switch means. A second switch means is coupled to the high frequency clock source and the low frequency clock source for switching the high frequency clock signal with an inverse of the low frequency clock signal to generate a second modulated clock signal at an output of the second switch means. The device has a digital circuit coupled to the output of the first switch means being clocked by the first modulated clock signal. The device further includes a radio frequency receiver having a receiver amplifier. The first modulated clock signal is coupled into the receiver amplifier by radiation from a conductor between the output of the first switch means and the digital circuit. The second modulated clock signal is coupled into the receiver amplifier to counteract harmonic content of the first modulated clock signal at the receiver amplifier. In one embodiment of the invention the digital circuit includes a synchronous dynamic random access memory. In a further embodiment of the invention the second modulated clock signal is coupled into the receiver amplifier via a parallel radiator located parallel to at least a portion of the conductor between the output of the first switch means and the digital circuit. In an alternative embodiment of the invention the second modulated clock signal is conductively coupled into the receiver amplifier via an attenuator.

The invention further provides a method for reducing radio frequency interference in an electronic device. The method includes generating a first amplitude modulated (AM) signal within the device which has harmonic content in a receive band in which the electronic device receives radio frequency signals. The harmonic content is coupled into a receiver of the electronic device. The method also includes generating a second AM signal from the first AM signal by inverting the modulation of the first AM signal. The second AM signal is coupled to the receiver of the electronic device to reduce the harmonic content of the first AM signal at the receiver.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
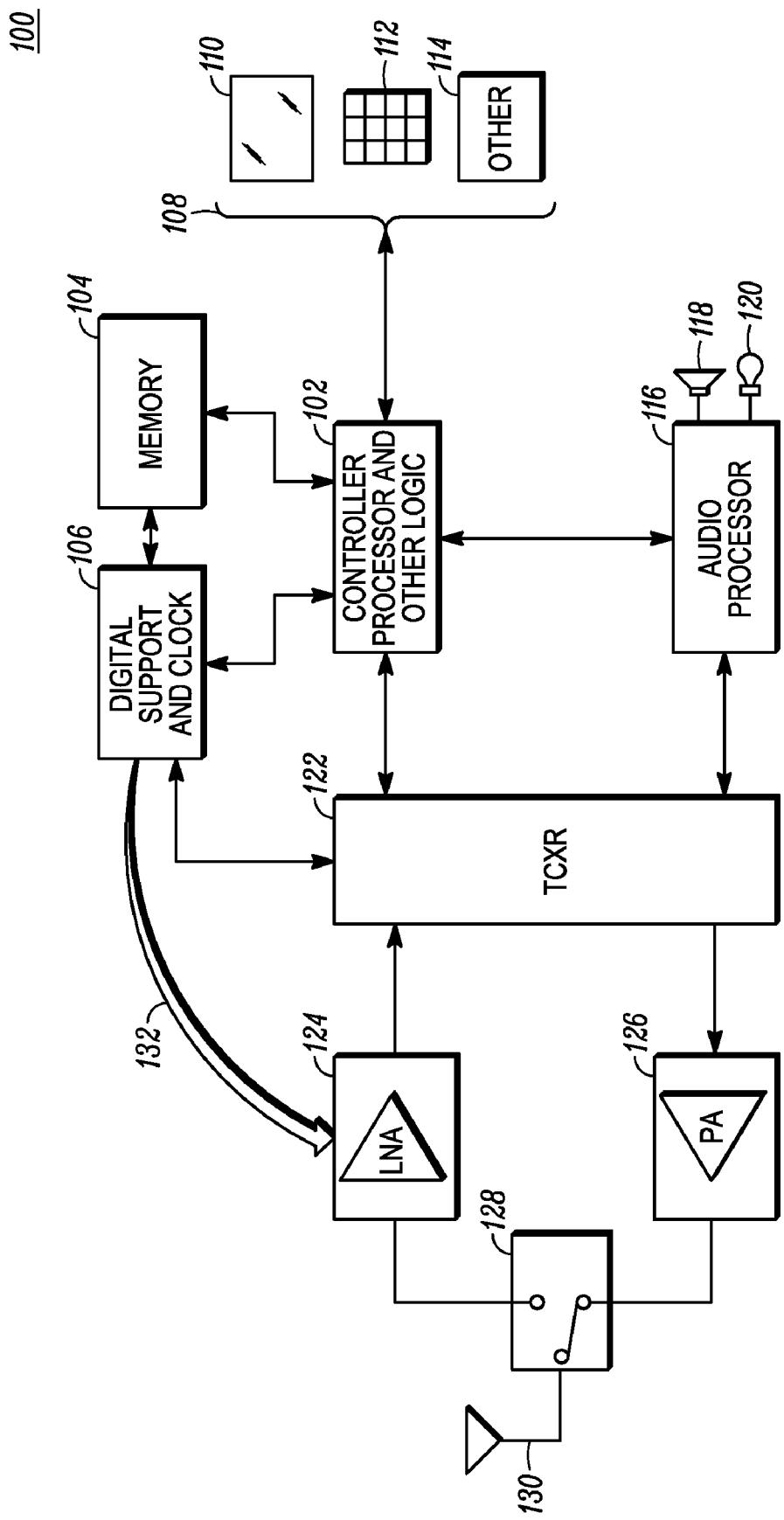
FIG. 1 shows a block schematic diagram of a wireless electronic device, in accordance with an embodiment of the invention.

Referring now to FIG. 1, there is shown a block schematic diagram of a wireless electronic device 100, in accordance with an embodiment of the invention. Central to the device is a main logic system including a controller 102, which includes a processor and other digital logic. The controller executed instruction code that may be stored in a memory 104, and performs logical and other digital tasks for controlling operation of the device and the various element and subsystems of the device. The memory 104 may include storage memory, volatile and non-volatile memory, execution memory for instantiating instruction code and applications, and so on, as is conventional. The device further comprises a clock system 106 for providing clock signals to the controller, digital circuits, and memory. The clock circuit generates the various clock signals that may be used for processing and other functions. The clock circuit may also switch the clock signals on and off, as needed, for power conservation modes of operating the device.

To provide control and operation of the device to a user, the device provides a user interface 108, which may include, for example, a graphical display 110, a keypad and other buttons 112, and other elements 114 for producing perceptible feedback to a user such as a vibratory motor and audio transducers. To facilitate voice communication, the device may include an audio processor 116. The audio processor receives digital audio signals and converts them to analog form for playing over a speaker 118 or other audio transducer. A microphone 120 is used to receive acoustic signals and covert them to audio signals. The audio processor converts the audio signals received from the microphone to digital form for processing. To further support voice communication, the device includes a radio frequency transceiver 122. The transceiver includes various radio frequency and baseband processing circuits to perform baseband signal generation, mixing, modulation, and frequency synthesis, for example. The transceiver may contain its own frequency reference, or it may receive a clock signal from the digital clock circuit 106. The transceiver receives RF signals from a receiver 124 and down converts them. The signals may be voice or audio signals to be played by the audio processor, or data for use by the device or applications being executed on the device. Similarly, the transceiver up converts signals to be transmitted and provides the upconverted signals to a RF power amplifier (RFPA) 126. The RFPA 126 and receiver 124 are coupled to a switch or isolator 128 and further coupled to an antenna 130.

According to the invention, the clock circuit generates a clock signal that is the product of a low frequency clock and a high frequency clock signal. The result is effectively an amplitude modulated clock signal that has broadband harmonic content. Even though the clock signal is low power, the higher frequency components can radiate from conductors between the clock circuit and digital circuits which use the clock signal. Any coupling of these harmonics can be reduced if not substantially eliminated at most of the components in the device. However, the harmonics can couple into the receiver 124 as indicated by arrow 132, and may not be avoidable by conventional frequency planning because they are close together relative to the frequency of the receive band. The presence of these clock harmonics in the receive band can substantially impair receiver performance.

Figure 2:
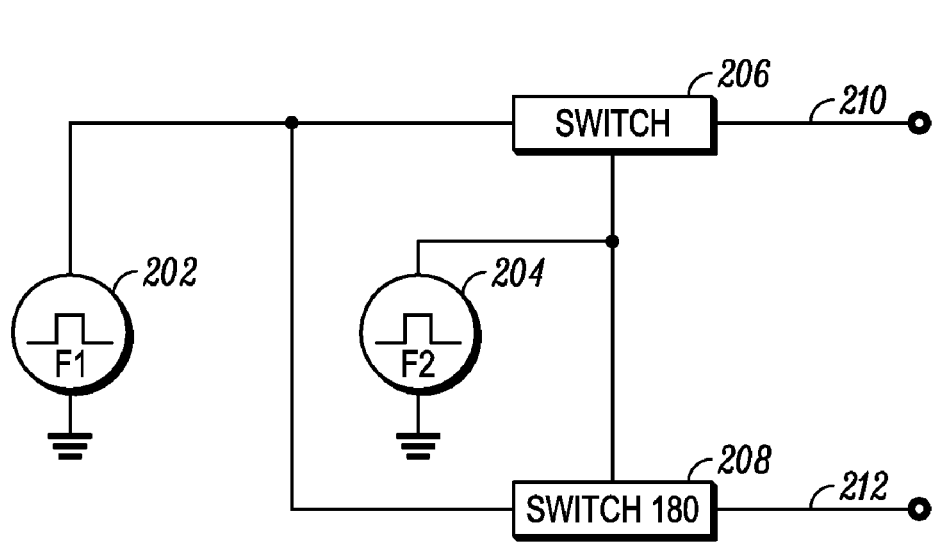
FIG. 2 shows a block schematic diagram of a clock generation system, in accordance with an embodiment of the invention.

Referring now to FIG. 2, here is shown a block schematic diagram of a clock generation system 200, in accordance with an embodiment of the invention. The system shown here allows for shutting off a main clock signal to various digital components, such as, for example, static memory, to conserve battery power. The system includes a first clock signal source 202 which operates at a high frequency, being the main clock frequency to be used by digital circuits in clocking their operation. The system also includes a second clock signal source 204 which provides a second clock signal at a low frequency. In one embodiment of the invention the first clock signal operates at substantially 19.2 MHz while the second clock signal source operates at 300 KHz. The clock signals are both substantially square wave, but the rise and fall times may be adjusted to reduce harmonic content. The first clock signal source is coupled to a first switch 206 for interrupting the first clock signal. The switch is operated by the second clock signal. As a result, the output of the switch on line 210 is substantially the product of the first clock signal and the second clock signal. Each of the clock signals are further coupled to a second switch 208. However, the second switch is operated on the inverse of the second clock signal. Thus, the output at the second switch on line 212 is the inverse of the signal on line 210. Since the output of the clock system are signals that are the product of two clock signals, for the purpose of description herein the signals are referred to as modulated clock signals. The second modulated clock signal produced at line 212 may be produced by inverting the output of the second clock signal, or by separately generating another clock signal having an inverted duty cycle that is synchronized with the second clock signal source. Although described here as being a substantially square wave, implying a 50% duty cycle, it is contemplated that different duty cycles may be used, depending on the application, and the invention will have a similar result. The switches may be implemented with transistors such as metallic oxide semiconductor field effect transistors (MOSFETs), or any other suitable switching device. It is further contemplated that the signals may not be square clock signals, but more generally simply AM signals.

A first AM signal is generated in one part of the device which interferes with another part of the device. To counteract that interference, a second AM signal is generated by applying the inverse of the modulation applied to the first signal, and the second AM signal is then applied to counteract the effect of the first AM signal.

Figure 3:
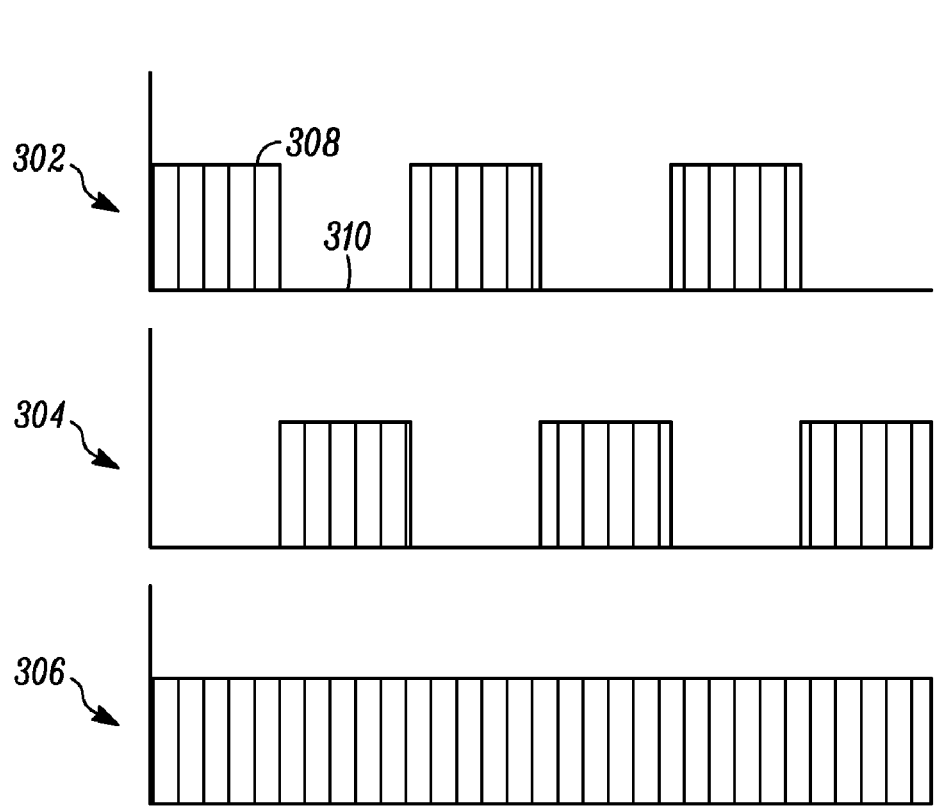
FIG. 3 shows a clock diagram of modulated clock signals generated in accordance with an embodiment of the invention.

The result of the switching operations is shown in FIG. 3, which shows clock diagrams 300 of modulated clock signals generated in accordance with an embodiment of the invention. A first modulated clock signal is represented by chart 302, and would be, for example, representative of the signal produced at the output 210 of the first switch 206 in FIG. 2. When the second clock signal is at a logical one state, for example at 308, causing the switch 206 to turn on, close, or otherwise allow conduction of the first clock signal, the first clock signal runs normally. When the second clock signal is at a logical zero level, as at 310, the first switch is closed, resulting in no clock signal being present at the output of the switch. Thus, the modulated clock signal that results is effectively an amplitude modulated clock signal where a low frequency clock signal modulates the high frequency clock signal. It is expected that the low frequency clock signal is less than half the frequency of the high frequency clock signal, but more practically the low frequency clock signal will be on the order of one tenth to one one-hundredth the frequency of the high frequency clock signal. This modulated clock signal contains broadband harmonic content, and may be characterized as harmonics of the high frequency clock signal's fundamental frequency with spurs surround each harmonic. Those spurs are spaced from each harmonic by harmonics of the low frequency clock signal. For example, given a 19.2 MHz high frequency clock signal modulated at 300 KHz, each harmonic of 19.2 MHz will have spurs at 19.2 MHz±300 KHz and at multiples of 300 KHz from the harmonics of 19.2 MHz. And since the clock signals are substantially square waves, the harmonic content is substantial. In a conventional frequency plan, harmonics of the 19.2 MHz may be avoided by frequency planning, if not otherwise suppressed, but when the effect of the 300 KHz modulation is included, the resulting broadband harmonic content is difficult to avoid.

The second graph 304 shows the second modulated clock signal as may be evident at the output 212 of the second switch 208 of FIG. 2. It is simply the inverse modulation of the first modulated clock signal. That is, when the second clock signal is at a logical one state, it's inverse is a logical zero state, resulting in the second switch being off. The third chart 306 shows the result of adding the two signals together. When the two signals are effectively summed, the harmonic content of the low frequency clock signal is essentially removed. Thus, the invention generates the second modulated clock signal to effectively add it to the first modulated clock signal to suppress the effect of harmonic content resulting from the low frequency clock signal modulation. However, the first modulated clock signal is not supplied directly to the circuits of interest, but is instead coupled into the radio frequency circuits by radiation and due to the close proximity of the radio circuits to the clock signal lines, being packaged in the small volume of a handheld wireless device.

Figure 4:
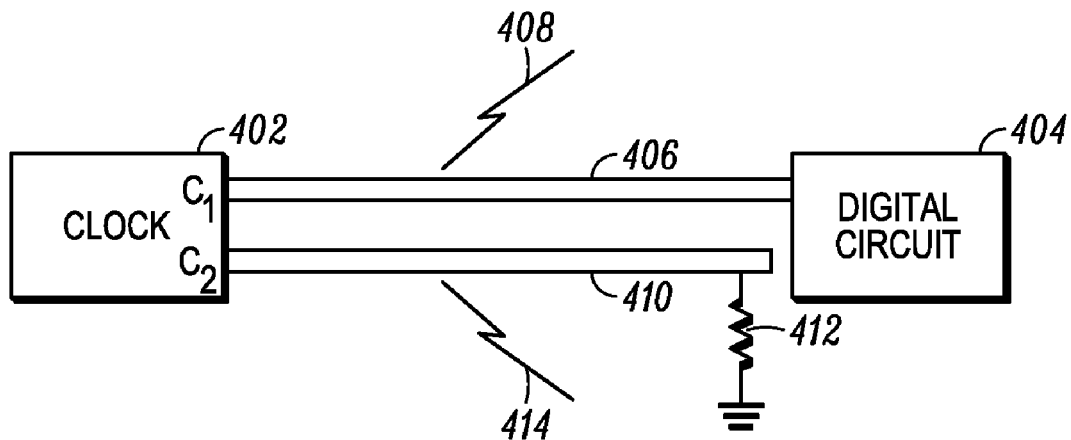
FIG. 4 shows a clock system coupled to a digital circuit and a strip line radiator for radiating a clock signal to counteract the radiated effect of another clock signal, in accordance with an embodiment of invention.

There are a variety of ways to couple the second modulated clock signal to the circuitry affected by the first modulated clock signal. However, any means for doing will either do so by radiating the second modulated clock signal or directly conducting it into the circuitry to counteract the electromagnetic interference (EMI) effect of the first modulated clock signal. For example, in FIG. 4 there is shown a diagram 400 of clock system 402 coupled to a digital circuit 404 and a strip line radiator 410 for radiating a clock signal to counteract the radiated effect of another clock signal, in accordance with an embodiment of invention. Specifically, the clock system 402 generates a first modulated clock signal $C_1$ on line 406 which is fed to the digital circuit 404 via a conductor 406. The conductor will typically be a conductor runner or a series of connected runners on a printed circuit board. Even though steps can be taken to minimize EMI from the signal on the conductor line, some EMI may still radiate 408 from the line. This radiated EMI may then couple into sensitive RF circuitry, such as a receiver amplifier. To counteract or suppress the effect of the radiated signal, the second modulated clock signal $C_2$ may be applied to another conductor radiator 410 which may be arranged in proximity to the line 406, and terminated with an appropriate impedance 412, for example, to control the amount of radiation 414 of the second modulated clock signal. By virtue of being collocated, the effect at the circuitry being affected by the EMI is that the coupled radiation will be more like the signal of 306 in FIG. 3, rather than the signal of 302 containing the higher harmonic content. In one embodiment of the invention, the conductor radiator is located parallel to the line 406 on which the first modulated clock signal is applied. However, space constraints my limit the shape and dimension of the conductor radiator. What is important is not where the second modulated signal is radiated from, but the magnitude of the radiated signal coupled into the radio circuit. Thus, if necessary, the second modulated clock signal may be amplified if necessary so that it arrives at the radio circuitry with a magnitude substantially equal to the magnitude at which the harmonics of the first modulated clock signal arrive.

Figure 5:
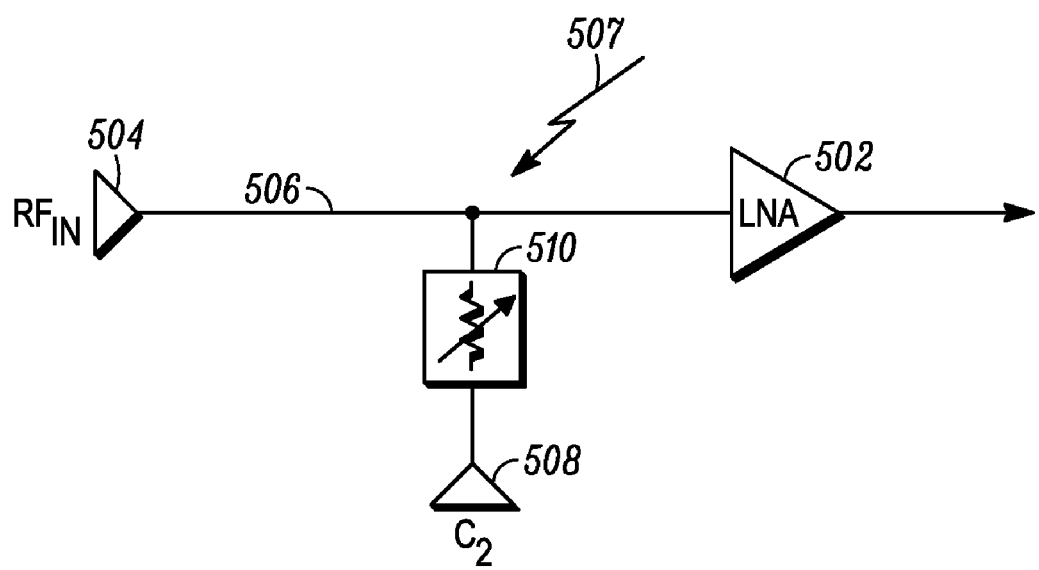
FIG. 5 shows a schematic diagram of a circuit for coupling a clock signal into a receiver, in accordance with an embodiment of the invention.

Alternatively, the second modulated clock signal may be directly applied via conduction into the sensitive circuit at the appropriate place. FIG. 5 shows a schematic diagram of a circuit 500 for coupling a clock signal into a receiver, in accordance with an embodiment of the invention. In the present example, a receiver amplifier 502, which may be a low noise amplifier, is used to amplify an incoming RF signal 504 on line 506, such as that received at an antenna. The radiated modulated clock signal 507 coupled into the receiver input, for example, also on the input line 506. To suppress or counteract the effect of the radiated modulated clock signal coupling into the receiver, the second modulated clock signal C2 508 is conducted into the same line 506, preferably through an attenuator or impedance 510. The attenuator 510 may be adjustable, allowing its value to be set, for example, at the time of manufacture upon testing the amount of coupling of the first modulated clock signal. The attenuator may also be adjusted during operation, when the receiver isn't receiving a transmitted signal, by measuring the noise floor and adjusting the attenuator to improve the noise floor.

This invention can be embodied in other forms without departing from the spirit or essential attributes thereof. Accordingly, reference should be made to the following claims, rather than to the foregoing specification, as indicating the scope of the invention.

What is claimed is:

1. A method of counteracting electro-magnetic interference (EMI) in an electronic device, comprising:
    generating a first modulated clock signal as the product of a high frequency clock signal and a low frequency clock signal, the low frequency clock signal having a duty cycle, and wherein the first modulated clock signal is radiated to at least one radio frequency component of the device;
    generating a second modulated clock signal as the product of the high frequency clock signal and the low frequency clock signal where the low frequency clock signal is applied with an inverted duty cycle; and coupling the second modulated clock signal to the at least one radio frequency component whereby the second modulated clock signal counteracts harmonic content of the first modulated clock signal at the at least one radio frequency component.

2. A method of counteracting EMI as defined in claim 1, wherein the first clock signal has a frequency greater than 1 megahertz.

3. A method of counteracting EMI as defined in claim 1, wherein generating the first and second modulated clock signals comprises switching the high frequency clock signal with the low frequency clock signal.

4. A method of counteracting EMI as defined in claim 1, wherein coupling the second modulated clock signal comprises coupling the second modulated clock signal to a receiver amplifier of the electronic device.

5. A method of counteracting EMI as defined in claim 4, wherein coupling the second modulated clock signal to the receiver amplifier comprises coupling the second modulated clock signal into an input of the receiver amplifier through an impedance.

6. A method of counteracting EMI as defined in claim 5, further comprising setting a value of the impedance so that the magnitude of the second modulated clock signal at the receiver amplifier is substantially equal to the magnitude of the first modulated clock signal at the receiver amplifier.

7. An electronic device, comprising:
a high frequency clock source generating a high frequency clock signal;
a low frequency clock source generating a low frequency clock signal;
a first switch means coupled to the high frequency clock source and the low frequency clock source for switching the high frequency clock signal with the low frequency clock signal to generate a first modulated clock signal at an output of the first switch means;
a second switch means coupled to the high frequency clock source and the low frequency clock source for switching the high frequency clock signal with an inverse of the low frequency clock signal to generate a second modulated clock signal at an output of the second switch means;
a digital circuit coupled to the output of the first switch means being clocked by the first modulated clock signal; and
a radio frequency receiver having a receiver amplifier;
wherein the first modulated clock signal is coupled into the receiver amplifier by radiation from a conductor between the output of the first switch means and the digital circuit; and
wherein the second modulated clock signal is coupled into the receiver amplifier to counteract harmonic content of the first modulated clock signal at the receiver amplifier.

8. An electronic device as defined in claim 7, wherein the digital circuit includes a synchronous dynamic random access memory.

9. An electronic device as defined in claim 7, wherein the second modulated clock signal is coupled into the receiver amplifier via a radiator conductor.

10. An electronic device as defined in claim 7, wherein the second modulated clock signal is conductively coupled into the receiver amplifier via an attenuator.

11. An electronic device as defined in claim 10, wherein the attenuator attenuates a magnitude of the second modulated clock signal at the receiver amplifier such that it is substantially equal to the magnitude of the first modulated clock signal at the receiver amplifier.

12. An electronic device as defined in claim 7, wherein the high frequency clock source has a frequency of at least one megahertz.

13. A method for reducing radio frequency interference in an electronic device, comprising:
generating a first amplitude modulated (AM) signal within the device, the AM signal having harmonic content in a receive band in which the electronic device receives radio frequency signals, the harmonic content coupling into a receiver of the electronic device;
generating a second AM signal from the first AM signal by inverting the modulation of the first AM signal; and
coupling the second AM signal to the receiver of the electronic device to reduce the harmonic content of the first AM signal at the receiver.

14. A method for reducing radio frequency interference as defined in claim 13, wherein generating the first AM signal comprises generating a modulated clock signal by the product of a high frequency clock signal and a low frequency clock signal.

15. A method for reducing radio frequency interference as defined in claim 14, wherein the modulated clock signal is provided to a digital circuit of the electronic device.

16. A method for reducing radio frequency interference as defined in claim 13, wherein coupling the second AM signal to the receiver is performed by radiating the second AM signal.

17. A method for reducing radio frequency interference as defined in claim 13, wherein coupling the second AM signal to the receiver is performed by conductively coupling the second AM signal to an input of the receiver through an attenuator.

18. A method for reducing radio frequency interference as defined in claim 17, further comprising adjusting the attenuator so that the magnitude of the second AM signal is substantially equal to the magnitude of the first AM signal at the input of the receiver.

* * * * *